US011081973B1

(12) United States Patent
Kruiskamp et al.

(10) Patent No.: US 11,081,973 B1
(45) Date of Patent: Aug. 3, 2021

(54) HIGH VOLTAGE TOLERANT INVERTER

(71) Applicant: Dialog Semiconductor B.V., s-Hertogenbosch (NL)

(72) Inventors: Marinus Wilhelmus Kruiskamp, 's-Hertogenbosch (NL); Petrus Hendrikus Seesink, Ouddorp (NL)

(73) Assignee: Dialog Semiconductor B.V., 's-Hertogenbosch (NL)

( * ) Notice: Subject to any disclaimer, the term of this patent is extended or adjusted under 35 U.S.C. 154(b) by 0 days.

(21) Appl. No.: 16/668,724

(22) Filed: Oct. 30, 2019

(51) Int. Cl.
*H02M 7/537* (2006.01)

(52) U.S. Cl.
CPC .................... *H02M 7/537* (2013.01)

(58) Field of Classification Search
CPC ............................. H02M 7/42–7/64
See application file for complete search history.

(56) References Cited

U.S. PATENT DOCUMENTS

| 9,923,527 | B2* | 3/2018 | McKay | H03F 3/193 |
| 2006/0232346 | A1* | 10/2006 | Ouici | H03K 3/0315 |
| | | | | 331/57 |
| 2014/0097888 | A1* | 4/2014 | Lee | H03K 19/018521 |
| | | | | 327/537 |
| 2015/0263610 | A1* | 9/2015 | Ferrant | H02M 3/073 |
| | | | | 327/536 |
| 2019/0288005 | A1* | 9/2019 | El Dirani | H02M 7/5387 |

* cited by examiner

*Primary Examiner* — Peter M Novak
(74) *Attorney, Agent, or Firm* — Saile Ackerman LLC; Stephen B. Ackerman (57) ABSTRACT

An inverter is presented. The inverter may be configured to receive an input voltage at an input node of the inverter, and to generate an output voltage at an output node of the inverter. The inverter may comprise a first transistor coupled between a supply node and the output node of the inverter. Further, the inverter may comprise a second transistor coupled between the output node of the inverter and a reference node. The input node of the inverter may be coupled to a back-gate of the first transistor and to a back-gate of the second transistor.

16 Claims, 6 Drawing Sheets

HIGH VOLTAGE TOLERANT INVERTER

TECHNICAL FIELD

The present document relates to inverter circuits. In particular, the present document relates to inverter circuits that can withstand higher input voltages than allowed by the gate-oxide of metal-oxide-semiconductor field-effect transistors (MOSFETs).

BACKGROUND

Figure 1:
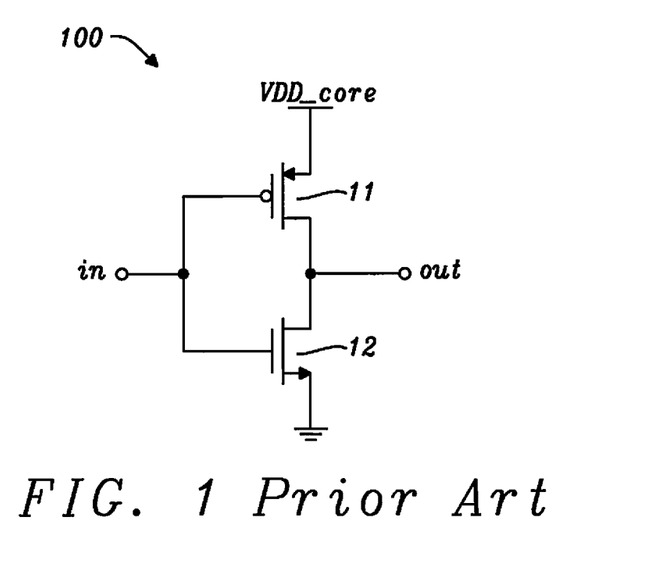
FIG. 1 shows a traditional CMOS inverter.

FIG. 1 shows a traditional complementary metal-oxide-semiconductor (CMOS) inverter 100 comprising a p-type transistor 11 and an n-type transistor 12. This inverter 100 may be used as a digital input buffer or level shifter for translating an input voltage into an output voltage. For example, a high value of the input voltage is translated into a low value of the output voltage by connecting the output node to a reference potential (such as e.g. ground), and a low value of the input voltage is translated into a high value of the output voltage by connecting the output node to the supply voltage VDD_core. At this, the high value of the (external) input voltage may be substantially higher than the high value of the (internal) output voltage, which corresponds to the supply voltage VDD_core. Generally speaking, the inverter 100 is capable of decoupling the high and low values of the input voltage from the high and low values of the output voltage.

In the inverter 100 depicted in FIG. 1, however, the high value of the input voltage should not exceed the maximum voltage rating (e.g. 1.8V) of the gate-oxides of transistors 11 and 12. For higher input voltages (such as e.g. 2.5V or 3.3 V), which are provided by certain external applications such as Universal Serial Bus USB applications, older sensor applications, or flash memory applications, different inverter topologies are required.

Figure 2:
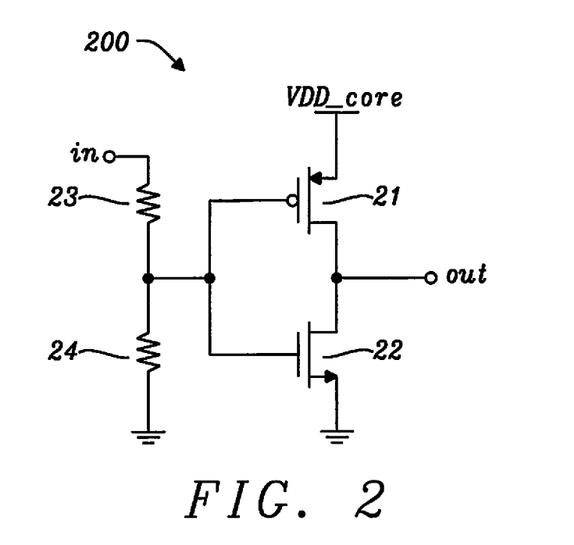
FIG. 2 shows a high-voltage tolerant inverter.

A first solution to cope with high input voltages is depicted in FIG. 2. FIG. 2 shows an inverter 200 comprising a resistive divider 23, 24 connected in series with a traditional CMOS inverter comprising transistors 21, 22. In addition, in FIG. 2, the supply voltage VDD_core may be reduced. The solution depicted in FIG. 2 shows the disadvantages of increased power consumption, increased circuit area, and reduced speed due to the RC filtering.

Figure 3:
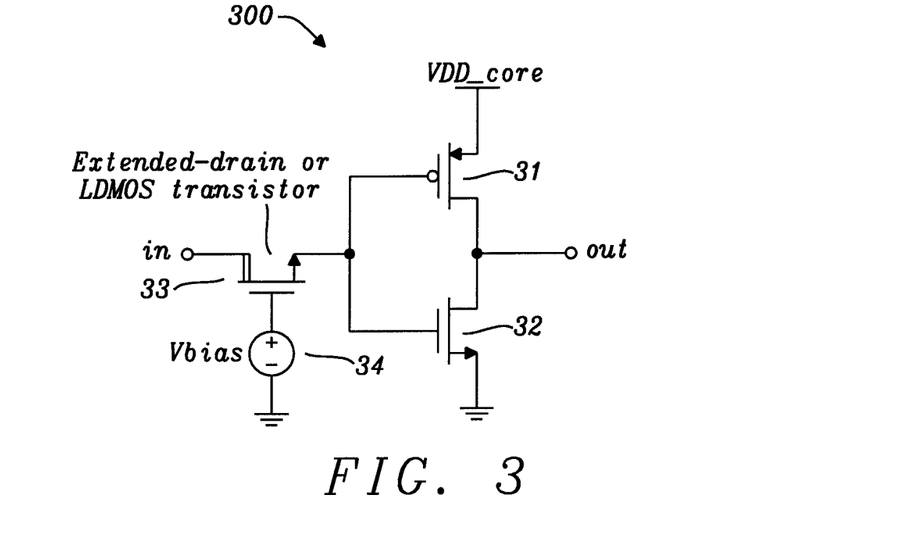
FIG. 3 shows another high-voltage tolerant inverter.

A second solution to cope with high input voltages is depicted in FIG. 3. FIG. 3 shows an inverter 300 comprising an n-type MOS transistor 33 connected in series with a traditional CMOS inverter comprising transistors 31, 32. The transistor 33 may be an extended-drain or LDMOS (laterally-diffused metal-oxide semiconductor) transistor. The gate of transistor 33 is biased at a suitable voltage by voltage source 34 such that transistor 33 limits the voltages entering the rest of the circuit. A drawback of the second solution depicted in FIG. 3 is that it might not be possible to set the threshold of the inverter 300 at the middle of the high and low level since the middle voltage might already be clipped by transistor 33.

The present document addresses the above-mentioned technical problems. In particular, the present document addresses the technical problem of providing an alternative, high voltage tolerant inverter circuit, which avoids the above-mentioned disadvantages.

SUMMARY

According to an aspect, an inverter is presented. The inverter may be configured to receive an input voltage at an input node of the inverter, and to generate an output voltage at an output node of the inverter. The inverter may comprise a first transistor coupled between a supply node and the output node of the inverter. Further, the inverter may comprise a second transistor coupled between the output node of the inverter and a reference node. The input node of the inverter may be coupled to a back-gate of the first transistor and to a back-gate of the second transistor.

Both the input voltage and the output voltage may represent binary signals (also known as logic or digital signals) having two possible signal values. The input voltage may alternate between a high value and a low value. The voltage at the supply node is denoted as supply voltage, and the voltage at the reference node is denoted as reference voltage. Thus, the output voltage at the output node may have a high value substantially similar to the supply voltage and may have a low value substantially similar to the reference voltage.

For example, the reference node may be ground and the reference voltage may be defined as 0V. In this regard, the skilled person understands that ground may not necessarily be a physical connection to earth. Instead, the reference node may be an arbitrary node to and from which currents may flow and from which voltages are measured.

For example, the first transistor may be a p-type MOS transistor and the second transistor may be n-type MOS transistor. Both transistors may be processed in a silicon-on-insulator (SOI) process. The source of the first transistor may be connected to the supply node, and the source of the second transistor may be connected to the reference node. The drains of both the first and the second transistor may be connected to the output node.

The back-gate may sometimes also be denoted as bulk, substrate, body, or back-body of a transistor. Traditionally, the back-gate is used to adjust the threshold voltage of the transistor and—in traditional inverter circuits—the input voltage is applied to the gates of the transistors. In the present document, however, it is proposed to reverse the function of the gates and the back-gates of a transistor as follows: the input voltage is applied to the back-gates for controlling the switching behavior of the transistors, and the gates of the transistors are used in a static manner for adjusting the overall threshold voltage of the proposed inverter. Said overall threshold voltage of the inverter may be defined as the input voltage when the output voltage changes from its low value to its high value. Alternatively, overall the threshold voltage of the inverter may be defined as the input voltage when the output voltage changes from its high value to its low value.

Applying the input voltage to the back-gates instead of the normal gates of the transistors increases the robustness of the inverter with regard to high input voltages. That is, the proposed inverter is capable of withstanding higher input voltages without getting damaged. Moreover, the electrostatic discharge (ESD) tolerance of the proposed inverter is improved compared to traditional inverter designs. Therefore, even if the applied input voltages are below the maximum allowed voltages, it is still beneficial to connect the input node to the back-gates of the transistors in harsh environments due to the improved ESD tolerance of the proposed inverter.

The inverter may comprise a bias circuit configured to provide a first bias voltage to a gate of the first transistor and to provide a second bias voltage to a gate of the second transistor such that the output voltage has a high value when the input voltage has a low value, and such that the output voltage has a low value when the input voltage has a high value. In other words, the bias circuit may be configured to provide the first bias voltage to the gate of the first transistor and to provide the second bias voltage to the gate of the second transistor such that the output voltage is an inverted version of the input voltage. In yet other words, the bias circuit may be configured to determine the first and the second bias voltages to adjust the threshold voltage of the inverter such that the above-described, typical switching behavior of an inverter is achieved. For example, the bias circuit may be configured to determine the first and the second bias voltages such that the threshold voltage of the inverter is in the middle between the high value of the input voltage and the low value of the input voltage. That is, the bias circuit may set the threshold level of the inverter close to the arithmetic mean of said high value and said low value. Depending on tolerances and noise levels, the threshold voltage may also deviate from said arithmetic mean.

The bias circuit may be configured to receive a high value of the input voltage and a low value of the input voltage. The bias circuit may be configured to determine said first bias voltage and said second bias voltage based on said high and low value of the input voltage.

Alternatively, the bias circuit may be configured to receive said input voltage from the input node of the inverter and to determine the high value and the low value based on the received input voltage. That is, the inverter may be capable of dynamically adapting to different levels and ranges of the input voltage and may therefore serve as an adaptive level shifter. For example, both the low value of the input voltage and the reference voltage may be 0V, and the inverter may be configured to translate a relatively high value of the input voltage into a lower value of the supply voltage. In general, the high and low values of the input voltage and the output voltage may be designed to have arbitrary values and may be independent of each other.

The gate and the back-gate of the first transistor may be arranged on opposite sides of the first transistor. The gate and the back-gate of the second transistor may be arranged on opposite sides of the second transistor. Specifically, the gate and the back-gate of the first transistor may be arranged on different sides of the first transistor's channel, and the gate and the back-gate of the second transistor may be arranged on different sides of the second transistor's channel.

The first transistor may comprise a gate isolation layer and a back-gate isolation layer. The gate isolation layer may be arranged in between the gate of the first transistor and the channel of the first transistor. The back-gate isolation layer may be arranged in between the back-gate of the first transistor and the channel of the first transistor. The back-gate isolation layer may be thicker than the gate isolation layer. For example, the gate isolation layer may comprise an oxide layer. The back-gate isolation layer may comprise an oxide layer, too. The improved tolerance of the presented inverter with regard to high input voltages may be seen as a direct consequence of the back-gate isolation layer being thicker than the gate isolation layer.

Similarly, the second transistor may comprise a gate isolation layer and a back-gate isolation layer, wherein said gate isolation layer may be arranged in between the gate of the second transistor and a channel of the second transistor, wherein said back-gate isolation layer may be arranged in between the back-gate of the second transistor and the channel of the second transistor, and wherein said back-gate isolation layer may be thicker than said gate isolation layer.

On the one hand, the bias circuit may comprise a first bias transistor forming a first current mirror with the first transistor. The first bias transistor may be e.g. a diode-connected transistor. In particular, the first bias transistor may be configured to convert an input current (through the first bias transistor) into a voltage, and the first transistor may be configured to convert the latter voltage into an output current (between the supply node and the output node of the inverter).

On the other hand, the bias circuit may comprise a second bias transistor forming a second current mirror with the second transistor. The second bias transistor may be e.g. a diode-connected transistor. In particular, the second bias transistor may be configured to convert an input current (through the second bias transistor) into a voltage, and the second transistor may be configured to convert the latter voltage into an output current (between the output node of the inverter and the reference node).

In the first current mirror, the current through the first transistor may be controlled based on the current though the first bias transistor and a first mirror ratio of the first current mirror. For instance, if the first mirror ratio is equal to 1, both currents may be forced to have equal current values. Analogously, in the second current mirror, the current through the second transistor may be controlled based on the current though the second bias transistor and a second mirror ratio of the second current mirror. Again, if the second mirror ratio is equal to 1, the current though the second transistor may be equal to the current though the second bias transistor.

For instance, the gate of the first bias transistor may be connected to the gate of the first transistor. The gate of the first bias transistor may be also connected to the drain of the first bias transistor. The gate of the second bias transistor may be connected to the gate of the second transistor. The gate of the second bias transistor may be also connected to the drain of the second bias transistor. The source of the first bias transistor may be connected to the supply node, and the source of the first second bias transistor may be connected to the reference node.

The first bias transistor and the second bias transistor may be connected in series between the supply node and the reference node. Alternatively, the inverter may comprise a first current source and a second current source. The first current source and the first bias transistor may be connected in series between the supply node and the reference node. The second current source and the second bias transistor may be connected in series between the supply node and the reference node. The first and the second current source may be configured to generate currents with a pre-determined current ratio. For example, the first and the second current source may be configured to generate currents with a pre-determined current ratio equal to 1 such that the generated currents are identical.

The bias circuit may be configured to adjust a first bias voltage at a back-gate of the first bias transistor and a second bias voltage at a back-gate of the second bias transistor such that an average of the first bias voltage and the second bias voltage equals an average of a high value of the input voltage and a low value of the input voltage. For example, the bias circuit may be configured to apply said high value as the first bias voltage and said low value as the second bias voltage. Alternatively, the bias circuit may be configured to apply said low value as the first bias voltage and said high value as the second bias voltage. According to another alternative, the bias circuit may be configured to apply said average of the high value of the input voltage and the low value of the input voltage as the first bias voltage to the back-gate of the first bias transistor and as the second bias voltage to the back-gate of the second bias transistor.

According to another aspect, a method is described. The method may comprise steps which correspond to the features of the inverter described in the present document. More specifically, a method of generating an output voltage at an output node of an inverter is presented. The method may comprise receiving an input voltage at an input node of the inverter. The method may comprise coupling a first transistor between a supply node and the output node of the inverter. The method may comprise coupling a second transistor between the output node of the inverter and a reference node. The method may comprise coupling the input node of the inverter to a back-gate of the first transistor and to a back-gate of the second transistor.

Moreover, the method may comprise providing, using a bias circuit, a first bias voltage to a gate of the first transistor and a second bias voltage to a gate of the second transistor such that the output voltage has a high value when the input voltage has a low value, and such that the output voltage has a low value when the input voltage has a high value.

The method may comprise receiving, using the bias circuit, a high value of the input voltage and a low value of the input voltage. The method may comprise determining, using the bias circuit, said first bias voltage and said second bias voltage based on said high and low value of the input voltage.

The gate and the back-gate of the first transistor may be arranged on opposite sides of the first transistor. Analogously, the gate and the back-gate of the second transistor may be arranged on opposite sides of the second transistor. The first transistor may comprise a gate isolation layer and a back-gate isolation layer. The method may comprise arranging the gate isolation layer in between the gate of the first transistor and a channel of the first transistor. The method may comprise arranging the back-gate isolation layer in between the back-gate of the first transistor and the channel of the first transistor. The back-gate isolation layer may be thicker than the gate isolation layer.

The method may comprise providing, within the bias circuit, a first bias transistor forming a first current mirror with the first transistor. The method may comprise providing, within the bias circuit, a second bias transistor forming a second current mirror with the second transistor. The method may comprise connecting the first bias transistor and the second bias transistor in series between the supply node and the reference node. Alternatively, the method may comprise connecting a first current source and the first bias transistor in series between the supply node and the reference node. The method may comprise connecting a second current source and the second bias transistor in series between the supply node and the reference node. The method may comprise generating, using the first and the second current source, identical currents.

Furthermore, the method may comprise adjusting, using the bias circuit, a first bias voltage at a back-gate of the first bias transistor and a second bias voltage at a back-gate of the second bias transistor such that an average of the first bias voltage and the second bias voltage equals an average of a high value of the input voltage and a low value of the input voltage.

According to a first embodiment, the method may comprise applying said high value as the first bias voltage and said low value as the second bias voltage. Or, the method may comprise applying said low value as the first bias voltage and said high value as the second bias voltage.

According to a second embodiment, the method may comprise applying said average of the high value of the input voltage and the low value of the input voltage (a) as the first bias voltage to the back-gate of the first bias transistor and (b) as the second bias voltage to the back-gate of the second bias transistor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DETAILED DESCRIPTION

Figure 4:
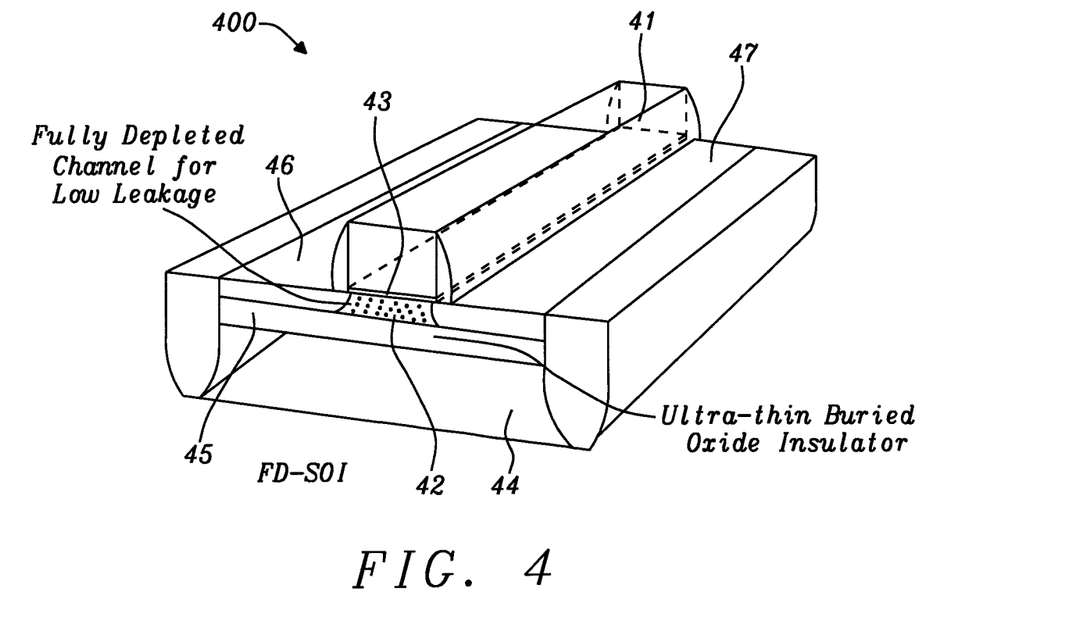
FIG. 4 shows a cross section of an FD-SOI transistor.

As already discussed, the present document relates to a novel inverter design which is based on the idea of controlling two transistors by applying an input voltage directly to the back-gates of said transistors. An exemplary transistor, which may be used within the proposed inverter, is illustrated in FIG. 4. In particular, FIG. 4 shows a cross section of an exemplary Fully Depleted Silicium-on-Insulator (FD-SOI) transistor 400. Transistor 400 may be produced e.g. by Globalfoundries Inc. in 22 nm-technology. The normal gate 41 is isolated from the channel 42 by a thin oxide 43 (gate isolation layer) like in a conventional process, but the channel 42 is isolated as well from the back-gate 44 by a thicker oxide 45 (back-gate isolation layer) below the channel 42. This oxide 45 is thicker and can withstand higher voltages, but is still thin enough for allowing the back-gate voltage to influence conductivity of the channel 42. This oxide 45 between the channel 42 and the well underneath (i.e. the back-gate 44) is different with respect to a conventional process and allows putting either a low or a high voltage on the back-gate 44. The illustrated transistor 42 also comprises a source 46 and a drain 47.

Figure 5:
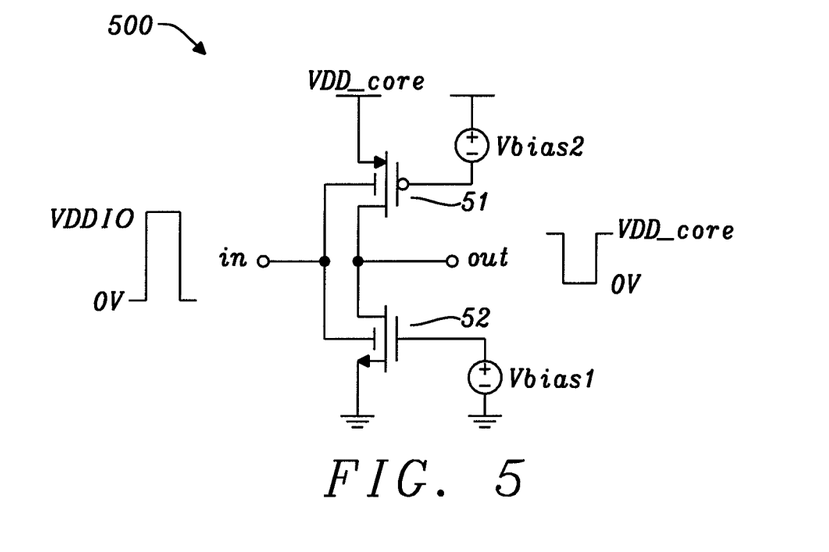
FIG. 5 shows a first exemplary inverter design.

The intended (by the foundry) purpose of the back-gate 44 is to change the threshold voltage of the transistor and still use the normal gate in a similar way as would be done in a conventional process. However, there is nothing preventing the controlling of the transistor by the back-gate 44 and from using the normal gate 41 in a static way (i.e. to reverse the operation of the back-gate 44 and the normal gate 41). If we do that for the inverter shown in FIG. 1, we get the inverter 500 as depicted in FIG. 5. FIG. 5 illustrates the basic idea of the invention. In the depicted inverter 500, the input voltage is applied to the back-gates of the first transistor 51 and the second transistor 52. With proper bias voltages Vbias2 and Vbias1 on the normal gates of transistor 51 and transistor 52, respectively, the threshold voltage of the inverter 500 can be tuned to be midway between the high value of the input voltage and the low value of the input voltage. The input voltage is allowed to be relatively high i.e. much higher than the rating of the thin-oxide 43 of the transistor depicted in FIG. 4. In the example shown in FIG. 5, the high value of the input voltage is denoted as VDDIO, the low value of the input voltage is 0V, the high value of the output voltage is denoted as VDD_core, and the low value of the output voltage is 0V. As will be shown in the below description and the following figures, the low values of the input voltage and the output voltage may also be different from 0V.

Figure 6:
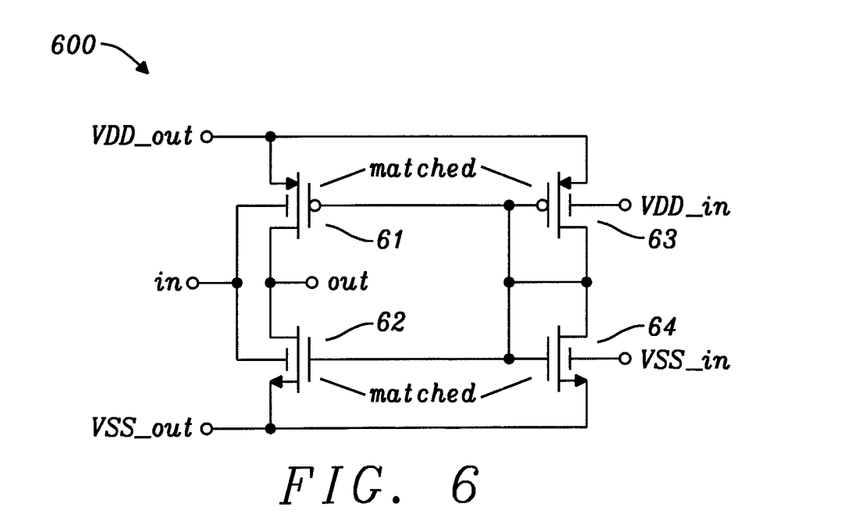
FIG. 6 shows a second exemplary inverter design.

There are several ways to generate these bias voltages. A simple but very effective way is depicted in FIG. 6. In the example shown in FIG. 6, the high value of the input voltage is denoted as VDD_in, the low value of the input voltage is denoted as VSS_in, the high value of the output voltage is denoted as VDD_out, and the low value of the output voltage is denoted as VSS_out. The two transistors 63 and 64 at the right-hand side of the inverter 600 form part of a bias (generator) circuit. Transistor 63 forms a first current mirror with transistor 61, and transistor 64 forms a second current mirror with transistor 62. One of the back-gates is connected to the high value of the input voltage (denoted as VDD_in in FIG. 6), the other is connected to the low value of the input voltage (denoted as VSS_in in FIG. 6). The biasing of the back-gates of transistor 63 and 64 can be either as depicted in FIG. 6, or the applied bias voltages VDD_in and VSS_in may be swapped; that also works but at a much higher quiescent current through the bias transistors 63 and 64. If the ratio between W/L from the transistor 63 to the W/L of the transistor 64 is about 3:1, the threshold voltage of the inverter 600 may be exactly halfway between VSS_in and VDD_in.

The transistors on the right-hand side of FIG. 6 are biasing the transistors 61, 62 at the left-hand side of FIG. 6. The wanted behavior is that the output voltage "out" is high (VDD_out) when the input voltage "in" is low (VSS_in), and that the output voltage "out" is low (VSS_out) when the input voltage "in" is high (VDD_in). As already mentioned, the threshold voltage of this inverter 600 (i.e. the input voltage "in" when the output "out" changes from VSS_out to VDD_out) should be somewhere in the middle between VSS_in and VDD_in. Let us consider both extreme states (i.e. the input voltage "in" is either VSS_in or VDD_in), and see if the output voltage "out" could be equal to the value of the gates (which is more or less the middle of VSS_out and VDD_out).

In the first situation, the input voltage is assumed to be at its low value (VSS_in). In that case, the source-, gate-, and back-gate-voltages of transistors 62 on the left and 64 on the right are equal. When also the drain voltages are similar, the currents would be the same. For the transistors 61 and 63, however, only the gate- and source-voltage are identical, but the back-gate of the left transistor 61 is much lower (VSS_in) than of the right transistor 63 (VDD_in). This means that the left transistor 61 is conducting more than the right transistor 63. The current in the right transistor 63 and the right transistor 64 are equal (since drains are connected to each other, and apart from that only connected to gates which do not conduct a DC-current). If the output voltage "out" would be in the middle, than the upper left transistor 61 conducts more than the lower left transistor 62, which will rise the output voltage "out" to a high level (almost VDD_out).

In the second situation, the input voltage is assumed to be at its high value (VDD_in). In that case the source-, gate-, and back-gate-voltages of the transistor 61 on the left and 63 on the right are equal. When also the drain voltages are similar, the currents would be the same. For the transistors 62 and 64, however, only the gate- and source-voltage are identical, but the back-gate of the left transistor 62 is much higher (VDD_in) than of the right transistor 64 (VSS_in). This means that the left transistor 62 is conducting more than the right transistor 64. The current in the right transistor 63 and the right transistor 64 are equal (since the drains are connected to each other, and apart from that only connected to gates which do not conduct a DC-current). If the output voltage "out" would be in the middle, than the lower left transistor 62 conducts more than the upper left transistor 61, which will drop the output voltage "out" to a low level (almost VSS_out).

As a results, the threshold voltage of the inverter 600 will be somewhere in the middle of the back-gate voltages of the right transistors 63, 64, which is exactly what we want. In general, the back-gates of the right transistors 63, 64 can be connected to other voltages, as long as the average value is in the middle of VSS_in and VDD_in. They could also both be connected to (VSS_in +VDD_in)/2, or VSS_in and VDD_in could be swapped. The circuit in FIG. 6 may be seen as an inverting level shifter from digital signals with levels equal to VSS_in (low) and VDD_in (high) to digital signals with levels equal to VSS_out (low) and VDD_out (high). This circuit may be useful in the following situations: (1) Driver of a high-side switch in a DC/DC-converter. The input signals can have digital-levels equal to the core voltage (e.g. VSS_in =0V and VDD_in 0.8V), whereas the output signal can have digital levels needed to drive a high-side PMOS switch (e.g. VSS_out=VBAT−2.5V and VDD_out=VBAT). (2) Output drivers: The input signals can have digital-levels equal to the core voltage (e.g. VSS_in =0V and VDD_in 0.8V), whereas the output signal can have digital levels equal to the IO supply (e.g. VSS_out=VSSIO=0V and VDD_out=VDDIO=3.3V).

In fact, the circuit of FIG. 6 may be used anywhere digital level shifters are needed. One major benefit of this level-shifter is that the difference between input- and output-levels can be higher than the allowed voltage on the normal gate of the transistors, which otherwise (conventional level shifters) is not easy to achieve.

Figure 7:
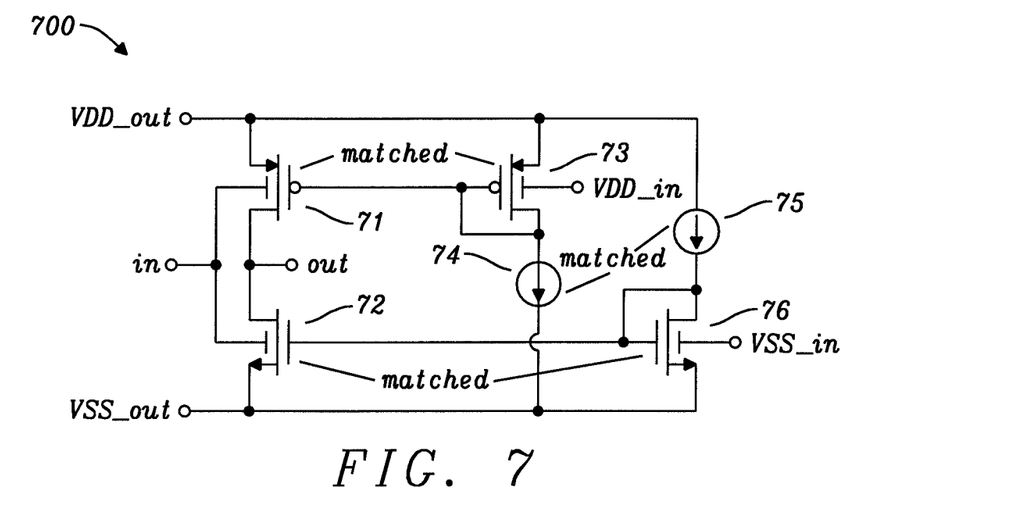
FIG. 7 shows a third exemplary inverter design.

Another way to generate the bias voltages is depicted in FIG. 7. With two bias currents generated by additional (matched) current sources 74 and 75, the quiescent current is better defined and less sensitive to process, supply voltage, and temperature (PVT) variations at the expense of a slightly more complex circuit. The exemplary inverter depicted in FIG. 7 also comprises a first transistor 71, a second transistor 72, and first bias transistor 73 and a second bias transistor 76. Again, back-gates of the right transistors 73 and 76 can be connected to other voltages, as long as the average value is in the middle of VSS_in and VDD_in. They could also both be connected to (VSS_in +VDD_in)/2, or VSS_in and VDD_in could be swapped.

The circuit 700 in FIG. 7 works as follows: The two NMOS transistors 72 and 76 form a current mirror, the two PMOS transistors 71 and 73 form another current mirror. If the input voltage "in" is VSS_in, both transistors 72 and 76 in the NMOS current mirror behave in a similar manner and the output current is similar to the input current, but the back-gates of the PMOS transistors 71 and 73 are not identical and the output of the PMOS transistor is more than its input current, making the output voltage "out" to rise towards VDD_out. If the input voltage "in" is VDD_in, the opposite will happen and the output voltage "out" will drop towards VSS_out.

The basic idea can be extended by adding hysteresis and power-down (or enable) switches. These variants are not described in this document, but they are in line with the variants that are available for traditional inverter circuits.

Figure 8:
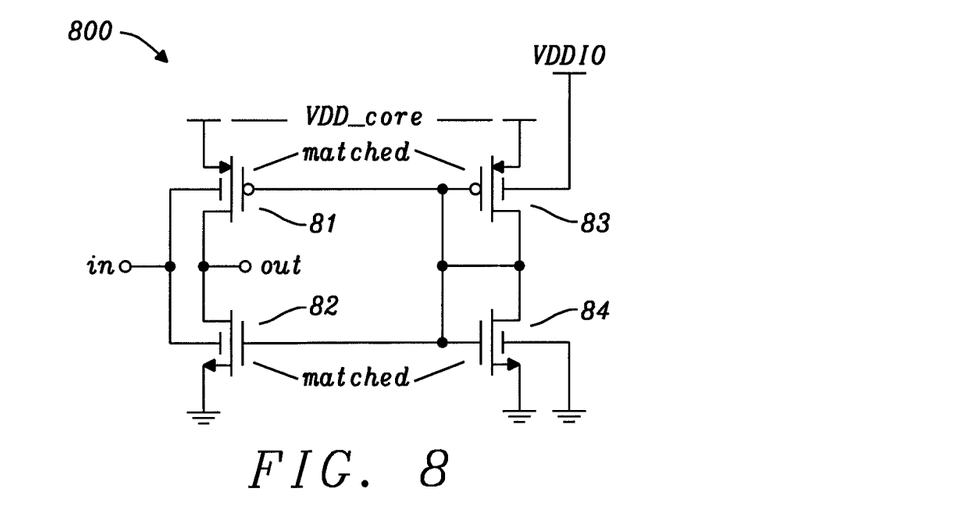
FIG. 8 shows a fourth exemplary inverter design.

FIG. 8 illustrates an exemplary inverter 800 for the specific case that the low value of the input voltage is 0V and that the low value of the output voltage is 0V. The inverter 800 comprises transistors 81, 82, 83, and 84 arranged in a similar manner as the transistors of the inverter 600 of FIG. 6. In the example shown in FIG. 8, the high value of the input voltage is denoted as VDDIO, the low value of the input voltage is 0V, the high value of the output voltage is denoted as VDD_core, and the low value of the output voltage is 0V.

Figure 9:
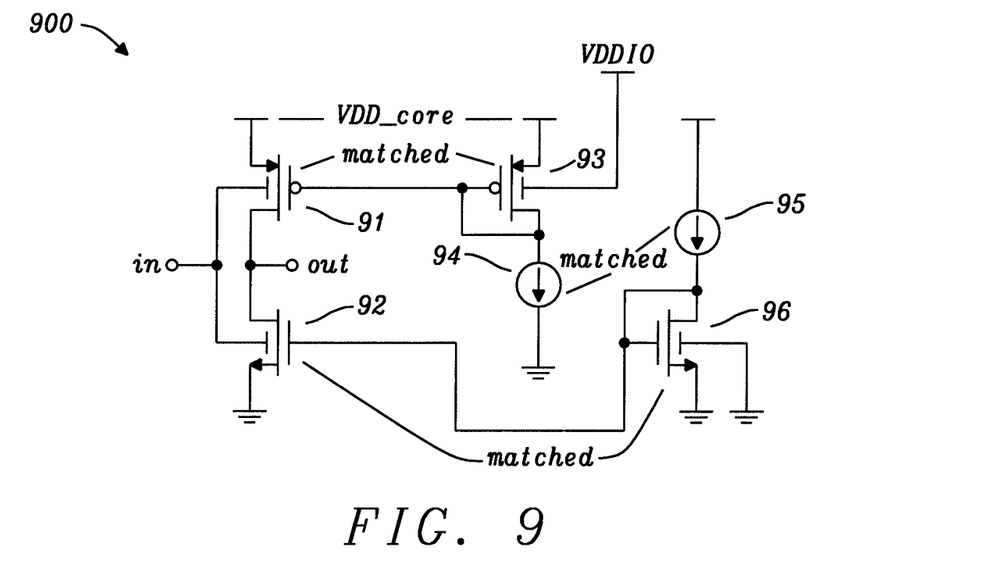
FIG. 9 shows a fifth exemplary inverter design.
Figure 10:
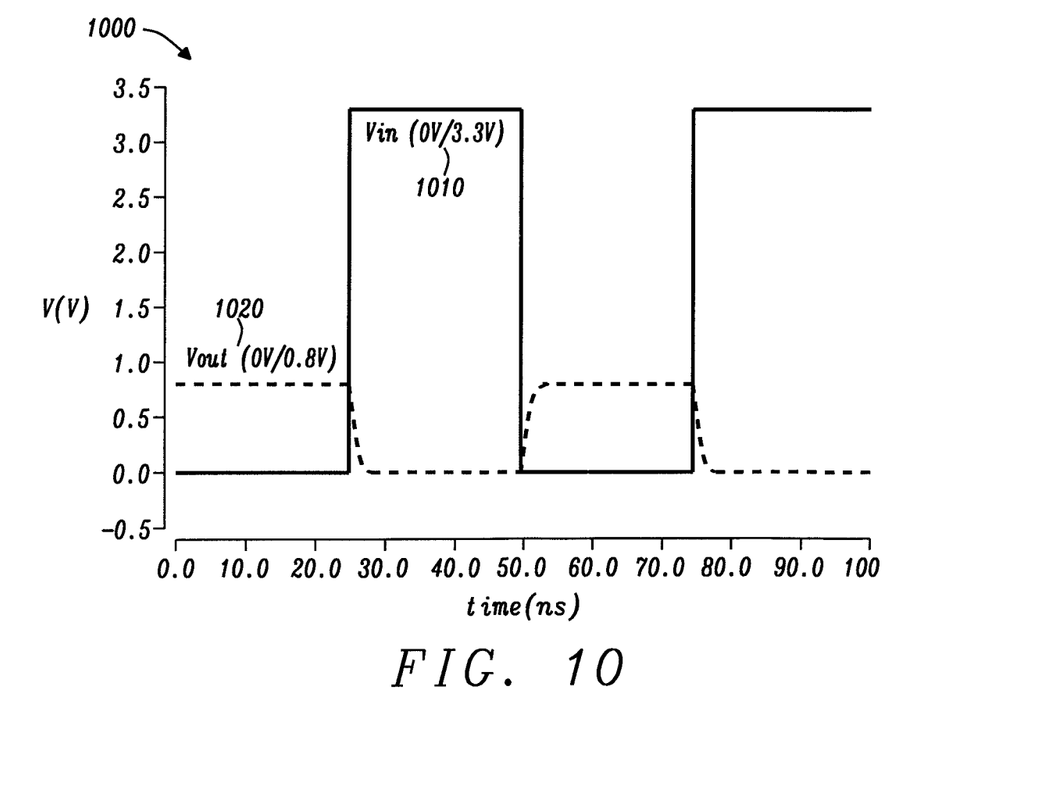
FIG. 10 shows simulation results.

FIG. 9 illustrates another exemplary inverter 900 for the specific case that the low value of the input voltage is 0V and that the low value of the output voltage is 0V. The inverter 900 comprises transistors 91, 92, 93, and 96 arranged in a similar manner as the transistors of the inverter 700 of FIG. 7. In addition, the matched power sources 94 and 95 are provided to force the currents through transistors 93 and 96 to be equal. In the example shown in FIG. 9, the high value of the input voltage is denoted as VDDIO, the low value of the input voltage is 0V, the high value of the output voltage is denoted as VDD_core, and the low value of the output voltage is 0V. FIG. 10 shows simulation results for the inverter 800 depicted in FIG. 8. Signal 1010 comprises the input voltage from 0 v to 3.3V, and signal 1020 comprises the output voltage from 0V to 0.8V.

Figure 11:
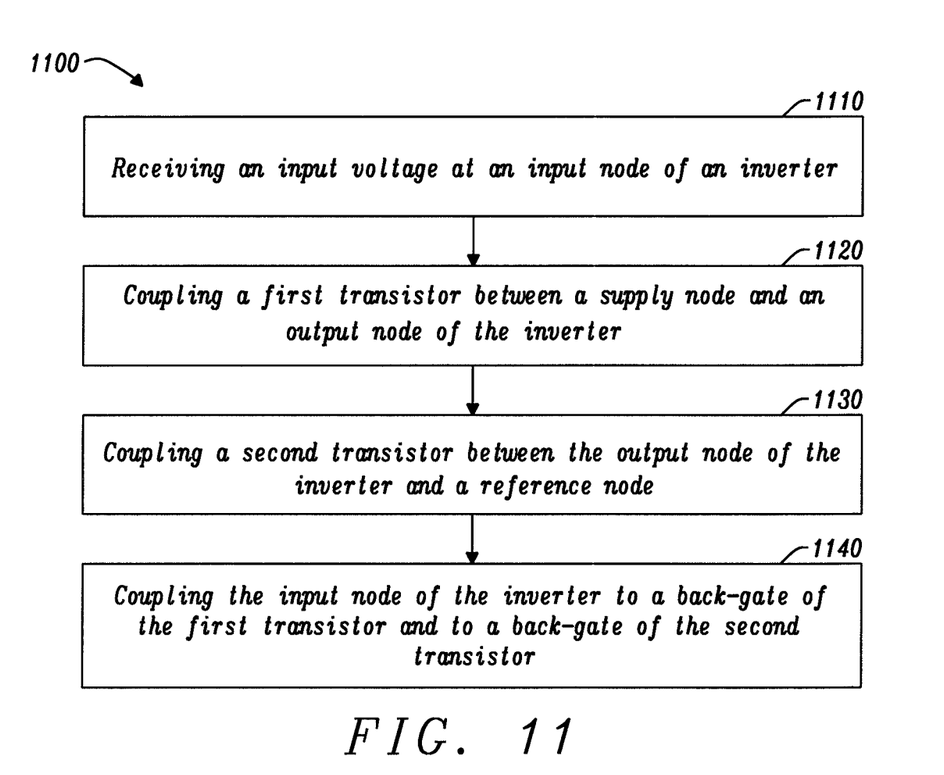
FIG. 11 shows a flowchart for generating an output voltage at an output node of an inverter.

FIG. 11 shows a method for generating an output voltage at an output node of an inverter. The method may comprise 1110, receiving an input voltage at an input node of the inverter. The method may also comprise 1120, coupling a first transistor between a supply node and the output node of the inverter. The method may also comprise 1130, coupling a second transistor between the output node of the inverter and a reference node. The method may also comprise 1140, coupling the input node of the inverter to a back-gate of the first transistor and to a back-gate of the second transistor.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. An inverter configured to receive an input voltage at an input node of the inverter and to generate an output voltage at an output node of the inverter, the inverter comprising:
    a first transistor coupled between a supply node and the output node of the inverter; and
    a second transistor coupled between the output node of the inverter and a reference node,
    wherein the first transistor comprises a gate and a back-gate which are arranged on opposite sides of the first transistor,
    wherein the second transistor comprises a gate and a back-gate which are arranged on opposite sides of the second transistor,
    wherein the input node of the inverter is coupled to the back-gate of the first transistor and to the back-gate of the second transistor,
    wherein the input node of the inverter is neither coupled to the gate of the first transistor nor to the gate of the second transistor, and
    wherein the first transistor comprises a gate isolation layer and a back-gate isolation layer, and wherein
        the gate isolation layer is arranged between the gate of the first transistor and a channel of the first transistor,
        the back-gate isolation layer is arranged between the back-gate of the first transistor and the channel of the first transistor, and
        the back-gate isolation layer is thicker than the gate isolation layer.

2. The inverter of claim 1, comprising a bias circuit configured to provide a first bias voltage to the gate of the first transistor and to provide a second bias voltage to the gate of the second transistor such that the output voltage has a high value when the input voltage has a low value, and such that the output voltage has a low value when the input voltage has a high value.

3. The inverter of claim 2, wherein the bias circuit is configured
    to receive a high value of the input voltage and a low value of the input voltage; and
    to determine said first bias voltage and said second bias voltage based on said high and low value of the input voltage.

4. The inverter of claim 1, wherein the bias circuit comprises
    a first bias transistor forming a first current mirror with the first transistor; and
    a second bias transistor forming a second current mirror with the second transistor.

5. The inverter of claim 4, wherein the first bias transistor and the second bias transistor are connected in series between the supply node and the reference node.

6. The inverter of claim 4, comprising a first current source and a second current source, wherein
    the first current source and the first bias transistor are connected in series between the supply node and the reference node;
    the second current source and the second bias transistor are connected in series between the supply node and the reference node; and
    wherein the first and the second current source are configured to generate currents with a pre-determined current ratio.

7. The inverter of claim 4, wherein the bias circuit is configured to adjust a first bias voltage at a back-gate of the first bias transistor and a second bias voltage at a back-gate of the second bias transistor such that
    an average of the first bias voltage and the second bias voltage equals an average of a high value of the input voltage and a low value of the input voltage.

8. The inverter of claim 7, wherein the bias circuit is configured to apply
    said high value as the first bias voltage and said low value as the second bias voltage; or said low value as the first bias voltage and said high value as the second bias voltage.

9. A method of generating an output voltage at an output node of an inverter, the method comprising receiving an input voltage at an input node of the inverter;

coupling a first transistor between a supply node and the output node of the inverter, wherein the first transistor comprises a gate and a back-gate which are arranged on opposite sides of the first transistor;

coupling a second transistor between the output node of the inverter and a reference node, wherein the second transistor comprises a gate and a back-gate which are arranged on opposite sides of the second transistor; and coupling the input node of the inverter to the back-gate of the first transistor and to the back-gate of the second transistor, wherein the input node of the inverter is neither coupled to the gate of the first transistor nor to the gate of the second transistor, wherein the first transistor comprises a gate isolation layer and a back-gate isolation layer, and wherein the gate isolation layer is arranged between the gate of the first transistor and a channel of the first transistor, the back-gate isolation layer is arranged between the back-gate of the first transistor and the channel of the first transistor, and the back-gate isolation layer is thicker than the gate isolation layer.

10. The method of claim 9, comprising providing, using a bias circuit, a first bias voltage to the gate of the first transistor and a second bias voltage to the gate of the second transistor such that the output voltage has a high value when the input voltage has a low value, and such that the output voltage has a low value when the input voltage has a high value.

11. The method of claim 10, comprising receiving, using the bias circuit, a high value of the input voltage and a low value of the input voltage; and determining, using the bias circuit, said first bias voltage and said second bias voltage based on said high and low value of the input voltage.

12. The method of claim 9, comprising providing, within the bias circuit, a first bias transistor forming a first current mirror with the first transistor; and providing, within the bias circuit, a second bias transistor forming a second current mirror with the second transistor.

13. The method of claim 12, comprising connecting the first bias transistor and the second bias transistor in series between the supply node and the reference node.

14. The method of claim 12, comprising connecting a first current source and the first bias transistor in series between the supply node and the reference node;

connecting a second current source and the second bias transistor in series between the supply node and the reference node; and generating, using the first and the second current source, currents with a pre-determined current ratio.

15. The method of claim 12, comprising adjusting, using the bias circuit, a first bias voltage at a back-gate of the first bias transistor and a second bias voltage at a back-gate of the second bias transistor such that an average of the first bias voltage and the second bias voltage equals an average of a high value of the input voltage and a low value of the input voltage.

16. The method of claim 15, comprising applying said high value as the first bias voltage and said low value as the second bias voltage; or applying said low value as the first bias voltage and said high value as the second bias voltage.

\* \* \* \* \*